United States Patent [19]

Wang

[11] Patent Number: 5,005,389
[45] Date of Patent: Apr. 9, 1991

[54] STEERING WHEEL LOCK

[76] Inventor: Mao-Hsiung Wang, No. 29-27, Hsu Tsuo Kang, Nan Kang Tsun, Ta Yuan Hsiang, Tayuan Hsien, Taiwan

[21] Appl. No.: 340,766

[22] Filed: Apr. 20, 1989

Related U.S. Application Data

[63] Continuation-in-part of Ser. No. 284,384, Dec. 14, 1988, abandoned.

[51] Int. Cl.$^5$ .............................................. B60R 25/02
[52] U.S. Cl. ........................................ 70/209; 70/226; 70/211
[58] Field of Search ................... 70/209–211, 70/202, 215, 199, 225, 226, 252

[56] References Cited

U.S. PATENT DOCUMENTS

| | | | |
|---|---|---|---|
| 3,245,239 | 4/1966 | Zaidener | 70/202 |
| 3,462,982 | 8/1969 | Moore | 70/209 |
| 3,664,164 | 5/1972 | Zaidener | 70/202 |
| 4,103,524 | 8/1978 | Mitchell et al. | 70/209 |
| 4,304,110 | 12/1981 | Fain | 70/209 |
| 4,738,127 | 4/1988 | Johnson | 70/209 |
| 4,823,573 | 4/1989 | Latta | 70/226 X |
| 4,887,443 | 12/1989 | Wang | 70/209 |

FOREIGN PATENT DOCUMENTS

| | | | |
|---|---|---|---|
| 106072 | 8/1964 | Denmark | 70/209 |
| 2718291 | 10/1978 | Fed. Rep. of Germany | 70/211 |
| 1127524 | 9/1968 | United Kingdom | 70/209 |
| 2039840 | 8/1980 | United Kingdom | 70/211 |

Primary Examiner—Gary L. Smith
Assistant Examiner—Suzanne L. Dino
Attorney, Agent, or Firm—Bacon & Thomas

[57] ABSTRACT

A steering wheel lock is disclosed, in particular, one utilizing two U-shaped hooks to engage a steering wheel and an elongated rod inserted through the two hooks and locked with a bolt to reduce the possibility of the vehicle being stolen and to protect the steering wheel from being illegally operated.

1 Claim, 6 Drawing Sheets

STEERING WHEEL LOCK

CROSS REFERENCE

This application is a continuation-in-part application of the application, Ser. No. 284,384 filed on Dec. 14, 1988, now abandoned.

BACKGROUND OF THE INVENTION

Locks for many years have played a major role in our daily life. They are still important to us today and will be treated the same in the near future as long as privacy and security are deemed necessary.

Many kinds of locks were designed and made, such as door locks, car locks, drawer locks... etc. The subject of this invention relates to a steering wheel lock. Although a few prior arts were designed and made, prior arts do exist and some inconveniences require improvement. For instance, the contractible rod 91 and the tubular rod 94 of FIG. 6, an exploded view of prior art, must be long enough so the prior lock can work properly. However, a long contractible rod will take too much space and will be inconvenient for a driver to operate the lock in the vehicle.

The inventor, in view of this, has invented this invention which may correct the above mentioned inconvenience and is more secure.

SUMMARY OF THE INVENTION

It is the primary object of this invention to provide a steering wheel lock which utilizes a hidden tubular member to adjust the distance of the two U-shaped members so as to adapt to a steering wheel.

It is another object of the present invention to provide a steering wheel lock which utilizes a latch rod to insert through two U-shaped members engaged with a steering wheel so as to lock the steering wheel with the two U-shaped members.

It is still another object of this invention to provide a steering wheel lock which is safer than prior art.

It is still another object of this invention to provide a steering wheel lock which is easy to operate.

It is a further object of this invention to provide a steering wheel lock which is inexpensive for mass production.

DETAILED DESCRILPTION OF THE PREFERRED EMBODIMENT

Figure 1:
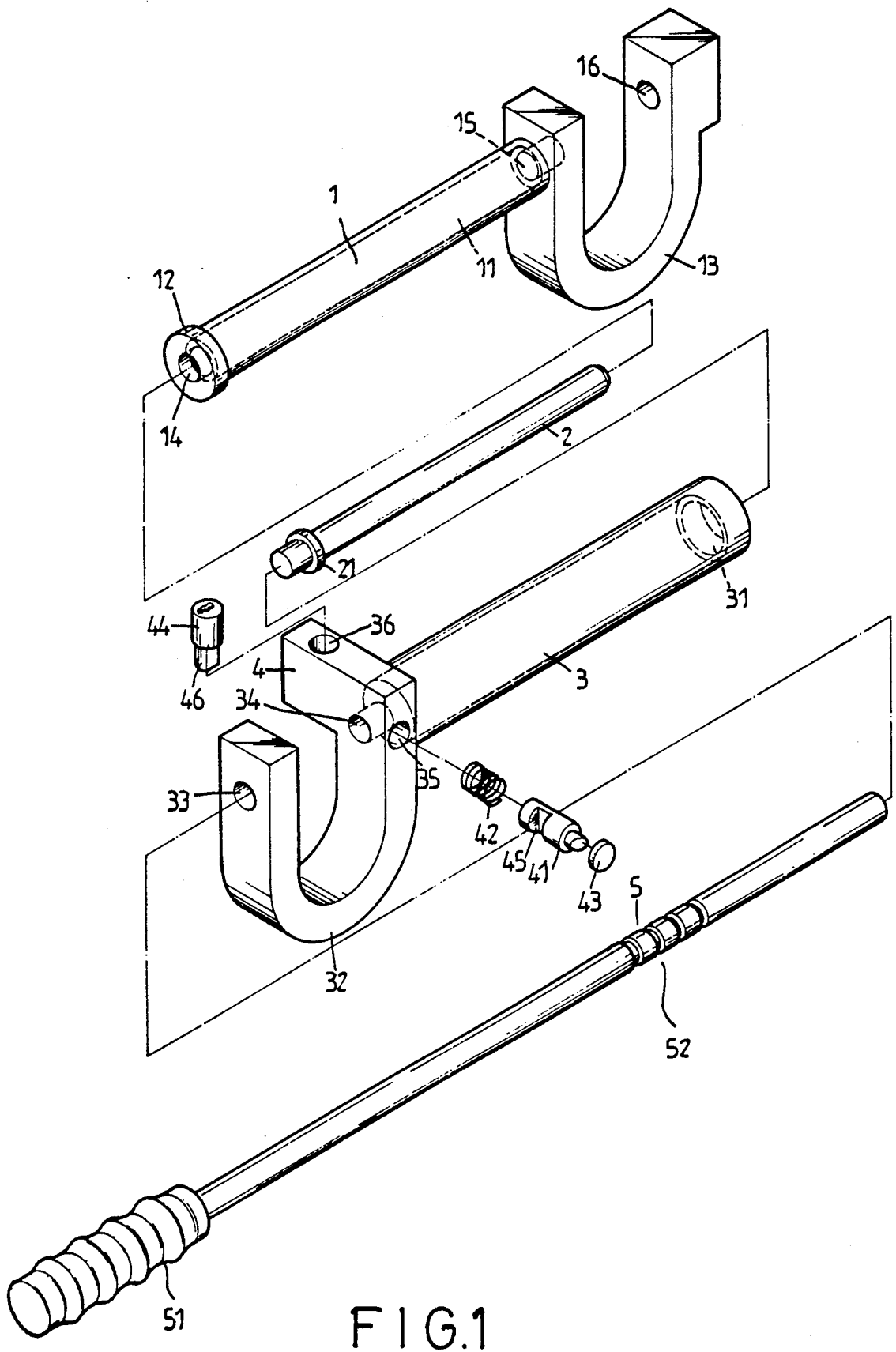
FIG. 1 is an exploded view of the present invention.
Figure 2:
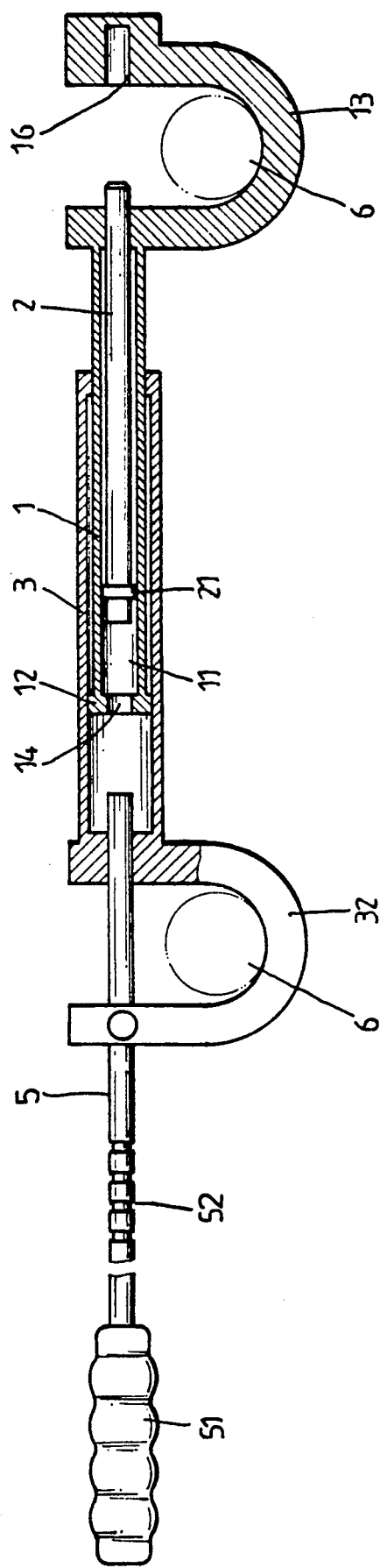
FIG. 2 is a sectional view of the present invention showing unlocked position.
Figure 3:
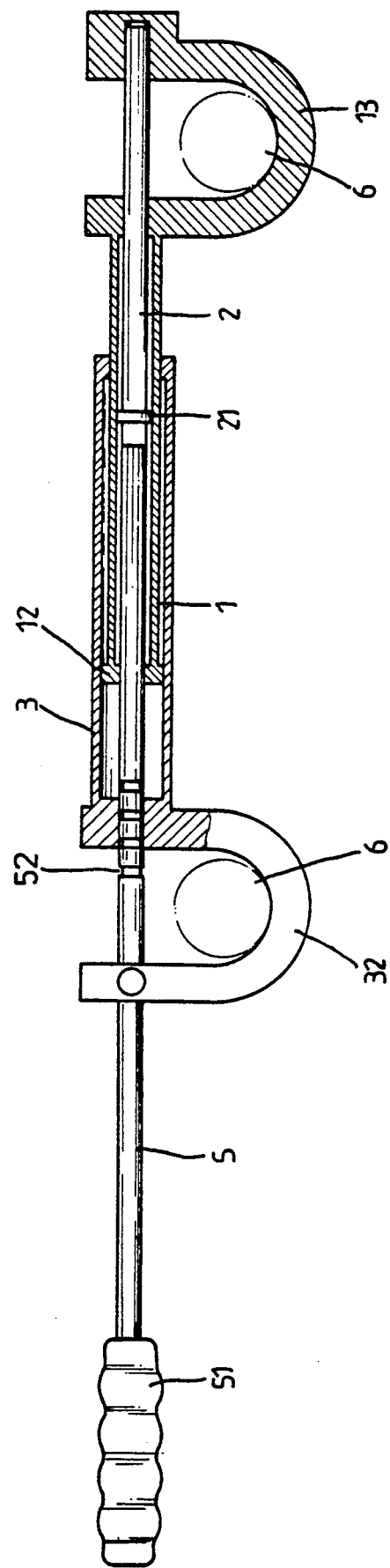
FIG. 3 is another sectional view of the present invention showing locked position; 4 is a perspective view of the present invention.
Figure 4:
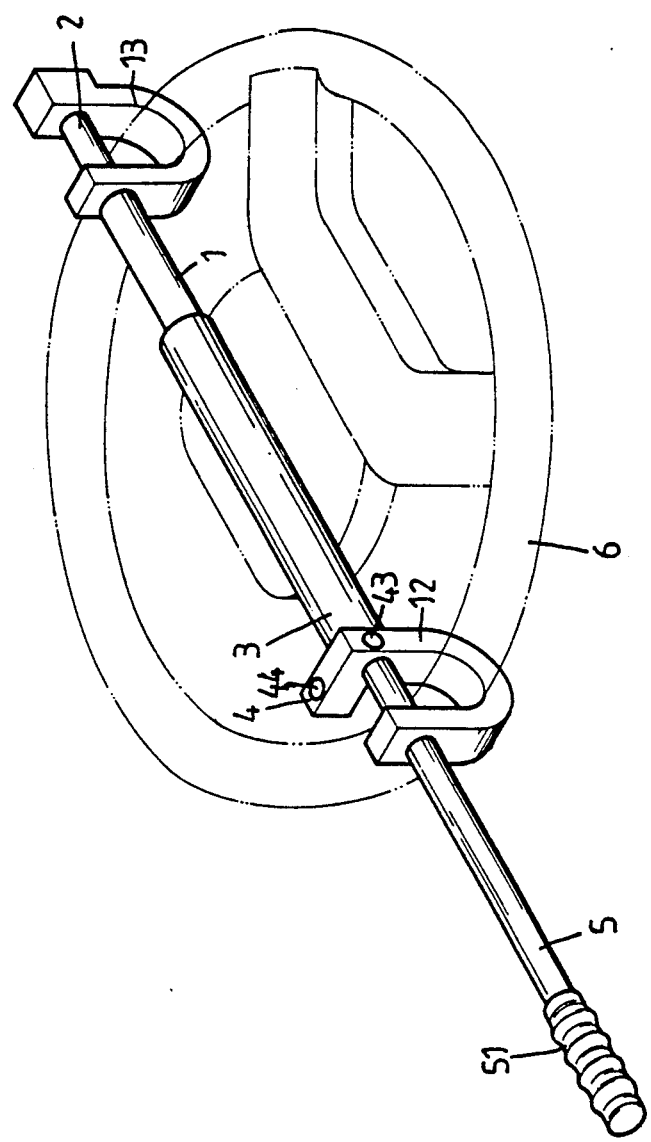
Figure 5:
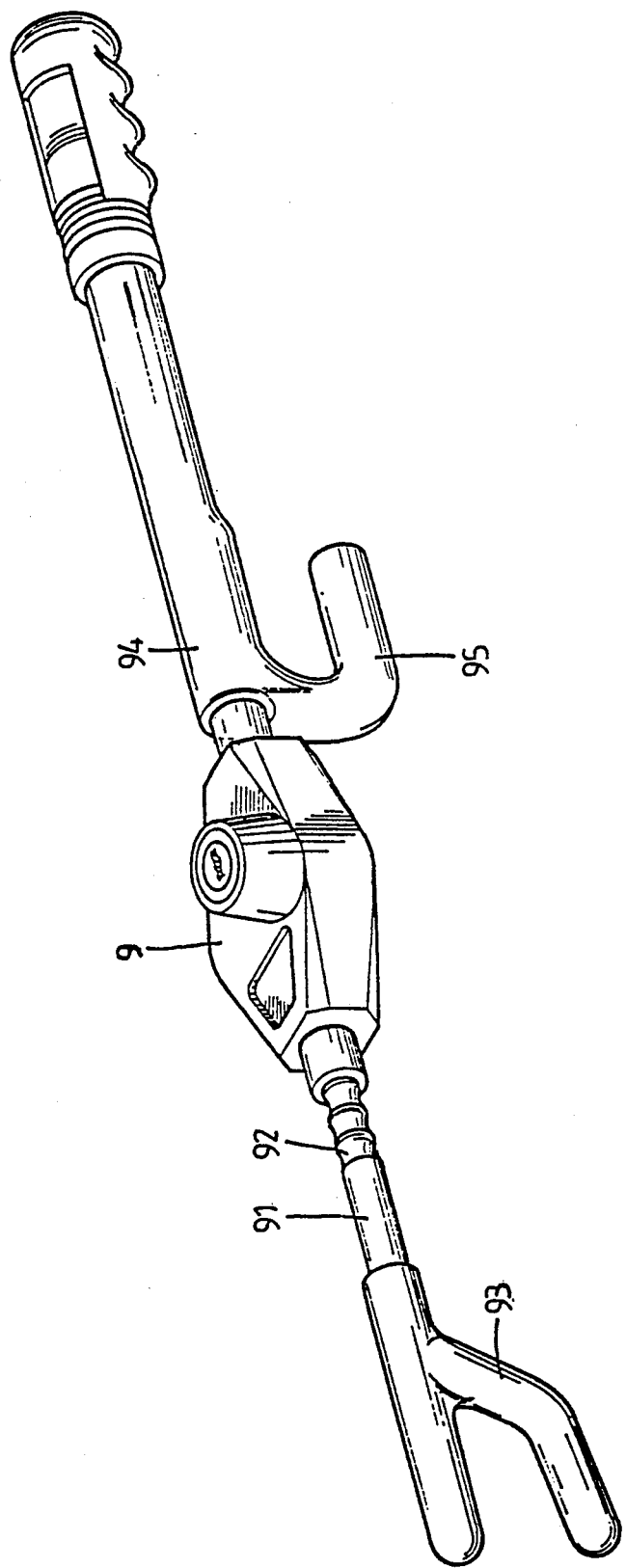
FIG. 5 is a perspective view of prior art.
Figure 6:
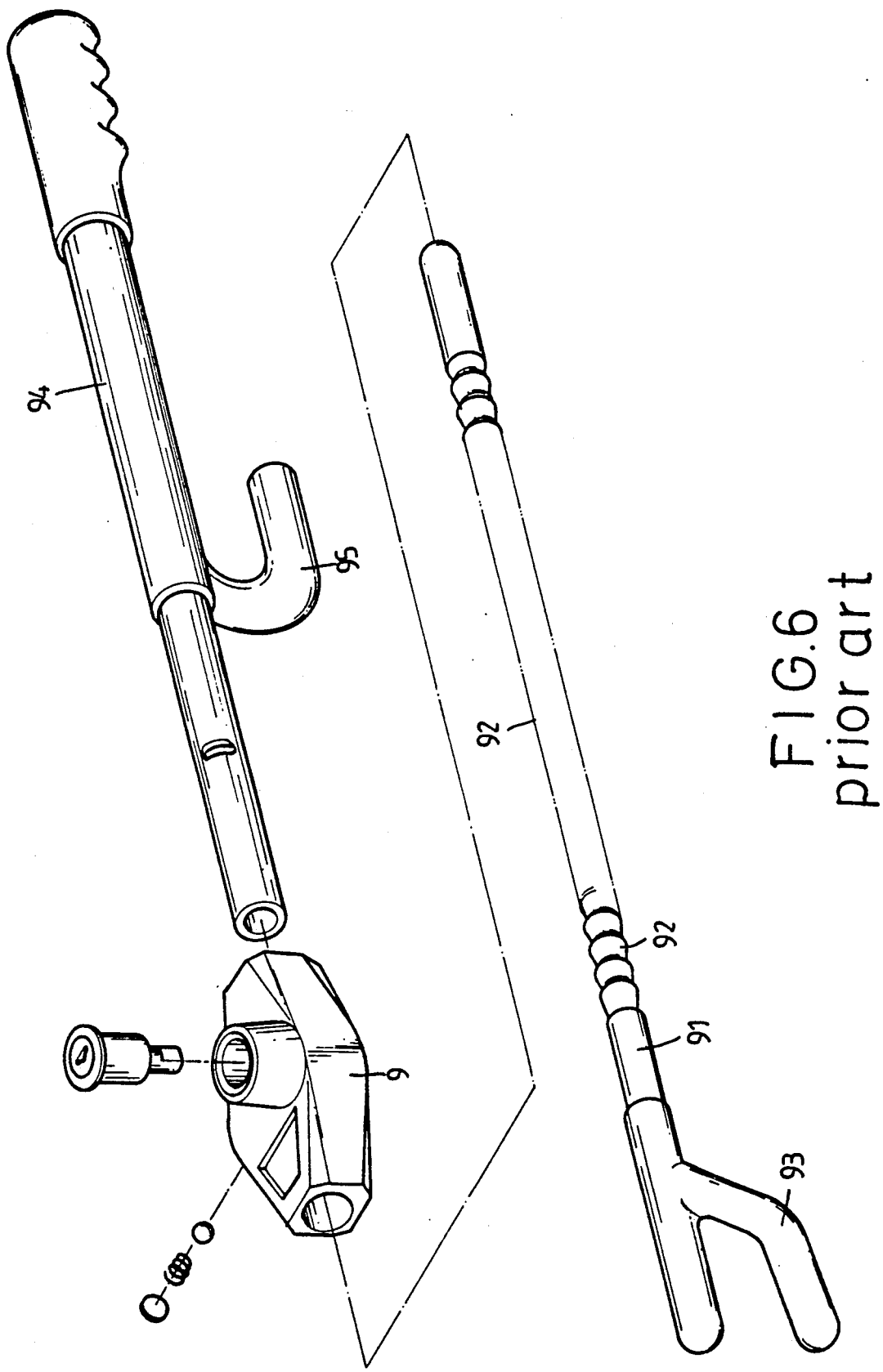
FIG. 6 is an exploded view of prior art.

With reference to the drawings and in particular to FIG. 1 which is an exploded view of the present invention, the present invention, according to the FIG. 1, comprises an inner tubular member 1 which is formed with a stop shoulder 12 at the left end and a U-shaped hook 13 at the right end. The inner tubular member 1 has a longitudinal hole 14 extending through the first leg of the U-shaped hook 13 connected therewith. A hidden tubular member 2 is a solid bar having a stop shoulder 21 at one end which diameter is larger than the diameter of the stop shoulder 12 of the inner tubular member 1. An outer tubular member 3 also has a stop shoulder 31 at its right end and a U-shaped hook 32 at its left end and has two aligned holes 33, 34 at the two legs of hook 32 respectively. A lock core 44 is provided in the hole 36 of the U-shaped hook 32. A spring 42, a bolt 41 and a cover 43 are sequentially disposed in a blind hole 35 in the second leg of U-shaped hook 32. It should be noted, however, that the principle and the function of the slot 45 in the bolt 41 and the actuating member 46 of the core 44 are well known in the art and will not be described in further detail. An elongated latch rod 5 has a handgrip 51 at one end and several grooves 52 on the rod 5 close to the other end. The latch rod 5 can be inserted through the aligned holes 33, 34, of the U-shaped hook 32, the outer tubular member 3 and the inner tubular member 1. With reference to FIG. 2, the device is asssembled by. firstly, placing the hidden tubular member 2 in the inner tubular member 1. The stop shoulder 12 of the inner tubular member 1 will prevent the hidden tubular member 2 from detaching because of its diameter is smaller than the stop shoulder 21. Secondly, the inner tubular member is placed in the outer tubular member 3, the stop shoulder 31 of the outer tubular member 3, likewise, will stop the inner tubular member l from detaching therefrom. Lastly, with reference made to FIG. 3, the latch rod 5 is inserted through the holes 33, 34, the outer tubular member 3 and the inner tubular member 1 and pushes the hidden tubular member 2 towards the holes 15, 16 of the U-shaped hook 13 of the inner tubular member 1. When the grooves 52 of the rod 5 pass through the hole 34, the rod 5 will be locked by the lock core 44 to complete the assembly procedure. When in use, a legal key may be inserted into the lock core 44 to release the bolt 41 from the grooves 52 of the rod 5 and draw out the rod 5. Then, the positions of the U-shaped hooks 13 and 32 maybe adjusted to engage the two U-shaped hooks with a steering wheel 6. Thereafter, the latch rod 5 is inserted through the holes 33, 34 of the U-shaped hook 32, the outer tubular member 3 and the inner tubular member 1 and pushes the hidden tubular member 2 out from the hole 15 of the inner tubular member 1 and against the hole 16 of the inner tubular member 1. Meanwhile, the grooves 52 of the latch rod 5 are engaged with the bolt 41 thereby locking the lock. When it is desired to release the present invention from the steering wheel, the core 44 is unlocked with a legal key and the latch rod 5 is drawn out from the U-shaped members.

With the foregoing description taken in connection with the accompanying drawings, it can be understood that the invention is not limited to the specific construction illustrated, but includes variants within the scope and spirit of the invention as define by the claim.

I Claim:

1. A steering wheel lock comprising:

(a) an inner tubular member connected at one end with one leg of a first U-shaped member and having an outer stop shoulder at an other end, said first U-shaped member having two legs each defining a first hole in alignment with said inner tubular member;

b) a hidden tubular member having a first outer stop shoulder at one end and adapted to be inserted through said inner tubular member;

c) an outer tubular member connected at one end with one leg of a second U-shaped member and having a second outer stop shoulder at an other end, the second U-shaped member having two legs each defining a second hole in alignment with the outer tubular member, said outer tubular member adapted to receive said inner tubular member so as to prevent said inner tubular member from detaching from said outer tubular member by engagement between said inner stop shoulder and said second outer stop shoulder;

(d) a lock core disposed in a leg of said second U-shaped member; and, e) an elongated latch rod having a handgrip at one end and circular grooves disposed toward an other end, said latch rod adapted to be inserted through said second holes in said second U-shaped member, said outer tubular member and said inner tubular member so as to push said hidden tubular member toward and into the first holes of said first U-shaped member of said inner tubular member such that said lock core may engage at least one of said grooves.

* * * * *